US012444891B2

(12) United States Patent
Mitsui et al.

(10) Patent No.: US 12,444,891 B2
(45) Date of Patent: Oct. 14, 2025

(54) TERMINAL FITTING AND CONNECTOR

(71) Applicant: SUMITOMO WIRING SYSTEMS, LTD., Mie (JP)

(72) Inventors: Shohei Mitsui, Mie (JP); Norihito Hashimoto, Mie (JP); Motoki Kubota, Mie (JP); Keisuke Kanemura, Mie (JP); Wataru Yamanaka, Mie (JP); Yusuke Ito, Mie (JP); Kazuya Kobayashi, Mie (JP)

(73) Assignee: SUMITOMO WIRING SYSTEMS, LTD., Mie (JP)

(*) Notice: Subject to any disclaimer, the term of this patent is extended or adjusted under 35 U.S.C. 154(b) by 445 days.

(21) Appl. No.: 17/915,323

(22) PCT Filed: Mar. 9, 2021

(86) PCT No.: PCT/JP2021/009110
§ 371 (c)(1),
(2) Date: Sep. 28, 2022

(87) PCT Pub. No.: WO2021/199946
PCT Pub. Date: Oct. 7, 2021

(65) Prior Publication Data

US 2023/0208086 A1 Jun. 29, 2023

(30) Foreign Application Priority Data

Mar. 30, 2020 (JP) ................................ 2020-059381

(51) Int. Cl.
*H01R 24/50* (2011.01)
*H01R 13/41* (2006.01)

(52) U.S. Cl.
CPC ............ *H01R 24/50* (2013.01); *H01R 13/41* (2013.01)

(58) Field of Classification Search
CPC ................................ H01R 24/50; H01R 13/41
(Continued)

(56) References Cited

U.S. PATENT DOCUMENTS 4,598,961 A * 7/1986 Cohen .................... H01R 24/50 439/877
4,846,711 A * 7/1989 Kobler .................. H01R 24/50 439/63

(Continued)

FOREIGN PATENT DOCUMENTS

JP 2009-252379 A 10/2009
JP 2012-022885 A 2/2012
JP 2013-048048 A 3/2013

OTHER PUBLICATIONS

International Search Report issued on Jun. 8, 2021 for WO 2021/199946 A1 (4 pages).

*Primary Examiner* — Gary F Paumen
(74) *Attorney, Agent, or Firm* — Venjuris, P.C.

(57) ABSTRACT

Provided is a terminal fitting and a connector with which the amount of insertion of the terminal fitting into a housing can be easily controlled. A terminal fitting includes: a tubular connection portion (41); a locking protrusion (51) that is provided so as to protrude from an outer circumferential surface side of the tubular connection portion (41), and is configured to be locked to a groove (66) provided in a housing (60); and a contact-stopper protrusion (55) that is provided on the outer circumferential surface side of the tubular connection portion (41) so as to protrude from mating edges (49) that abut against each other in a circumferential direction thereof in the tubular connection portion (41), and is configured to come into contact with the housing (60) and stop in place.

4 Claims, 9 Drawing Sheets

(58) Field of Classification Search
USPC .......................................................... 439/675
See application file for complete search history.

(56) References Cited

U.S. PATENT DOCUMENTS

| | | | | |
|---|---|---|---|---|
| 10,741,972 | B2 * | 8/2020 | Iwamoto ............ | H01R 13/6581 |
| 2019/0199008 | A1 | 6/2019 | Kanamura et al. | |
| 2020/0036140 | A1 | 1/2020 | Iwamoto et al. | |

* cited by examiner

TERMINAL FITTING AND CONNECTOR

CROSS REFERENCE TO RELATED APPLICATIONS

This application is a national phase of PCT application No. PCT/JP2021/009110, filed on 9 Mar. 2021, which claims priority from Japanese patent application No. 2020-059381, filed on 30 Mar. 2020, all of which are incorporated herein by reference.

TECHNICAL FIELD

The present disclosure relates to a terminal fitting and a connector.

BACKGROUND

Conventionally, as described in Patent Document 1 below, for example, a terminal fitting that has a tubular connection portion that extends in a front-rear direction is known. Press-fit protrusions are provided on the outer circumferential surface of the tubular connection portion. The press-fit protrusions are to be press-fitted into groves provided in a housing. As a result of the press-fit protrusions being press-fitted into the grooves, the terminal fitting is fixed to the housing.

PRIOR ART DOCUMENT

Patent Document

Patent Document 1: JP 2013-048048 A

SUMMARY OF THE INVENTION

Problems to be Solved

When the terminal fitting is to be inserted into the housing, the amount of insertion of the terminal fitting is controlled using a machine. However, it is difficult to detect that the amount of insertion of the terminal fitting exceeds a predetermined amount.

Therefore, the present disclosure aims to provide a terminal fitting and a connector with which the amount of insertion of the terminal fitting into the housing can be easily controlled.

Means to Solve the Problem

A terminal fitting according to the present disclosure includes: a locking protrusion that is provided so as to protrude from an outer circumferential surface side of the tubular connection portion, and is configured to be locked to a groove provided in a housing; and a contact-stopper protrusion that is provided on the outer circumferential surface side of the tubular connection portion so as to protrude from mating edges that abut against each other in a circumferential direction thereof in the tubular connection portion, and is configured to come into contact with the housing and stop in place.

Effect of the Invention

According to the present disclosure, it is possible to provide a terminal fitting and a connector with which the amount of insertion of the terminal fitting into the housing can be easily controlled.

DETAILED DESCRIPTION TO EXECUTE THE INVENTION

Figure 1:
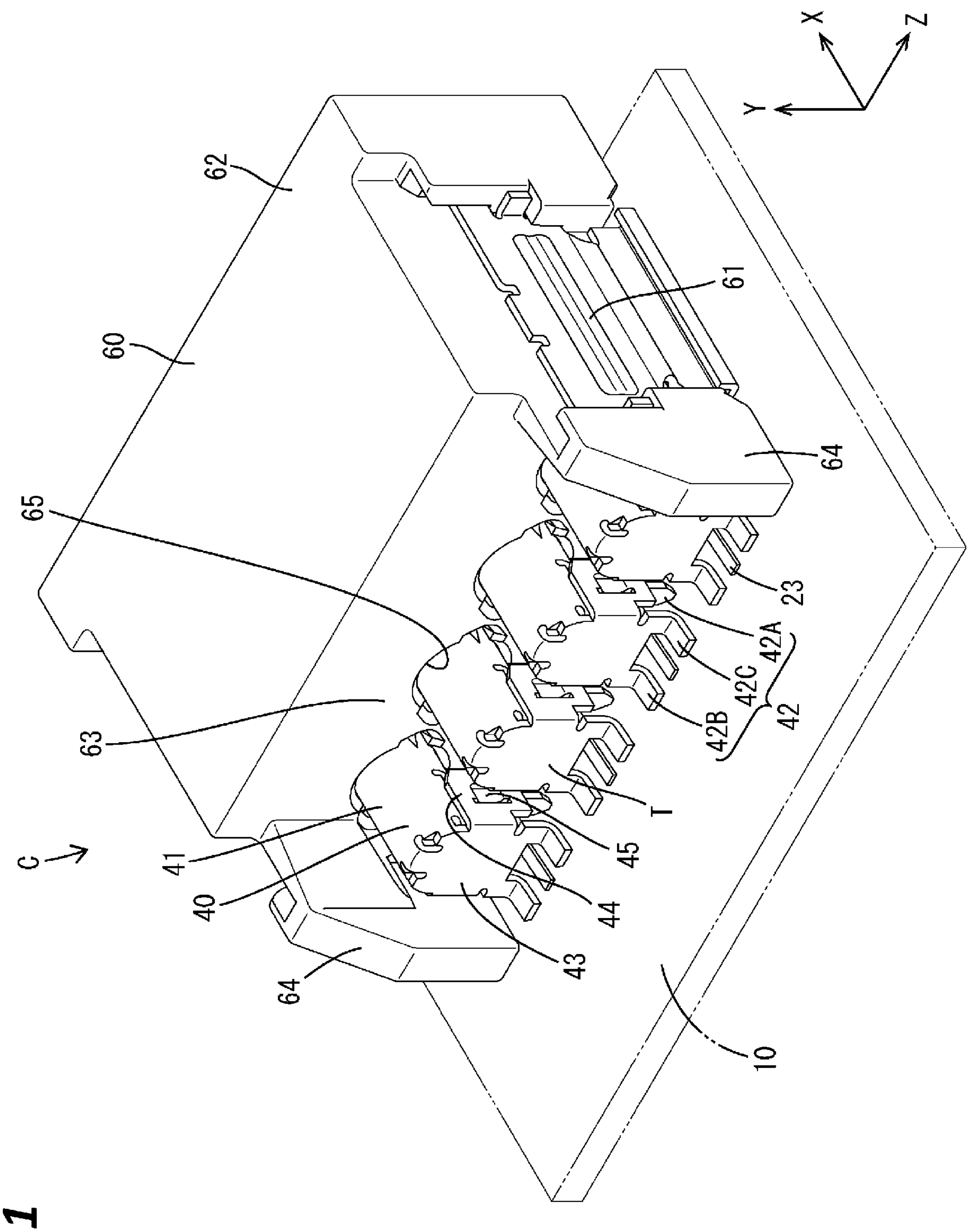
FIG. 1 is a perspective view showing a connector according to an embodiment.

Description of Embodiments According to Present Disclosure

First, embodiments of the present disclosure will be listed and described.

(1) A terminal fitting according to the present disclosure is a terminal fitting including: a locking protrusion that is provided so as to protrude from an outer circumferential surface side of the tubular connection portion, and is configured to be locked to a groove provided in a housing; and a contact-stopper protrusion that is provided on the outer circumferential surface side of the tubular connection portion so as to protrude from mating edges that abut against each other in a circumferential direction thereof in the tubular connection portion, and is configured to come into contact with the housing and stop in place. With such a configuration, as a result of the contact-stopper protrusion coming into contact with the housing and stopping in place, the insertion of the terminal fitting is stopped. Therefore, it is possible to easily control the amount of insertion of the terminal fitting into the housing. In addition, the contact-stopper protrusion is provided on one of the mating edges of the tubular connection portion. Therefore, it is possible to provide the contact-stopper protrusion without forming an opening in the tubular connection portion.

(2) It is preferable that the terminal fitting further includes a lead portion configured to be connected to a circuit board, the lead portion extends to one side on the outer circumferential surface side of the tubular connection portion, and the contact-stopper protrusion is provided on the one side of the tubular connection portion. With such a configuration, the side on which the mating edges of the tubular connection portion abut against each other and the side from which the lead portion extends can be the same side. Therefore, it is easier to manufacture the terminal fitting.

(1) A connector according to the present disclosure is a connector including: the terminal fitting; and a housing into which the terminal fitting is to be inserted. The housing has a contact-stopper groove into which the contact-stopper protrusion is insertable, and the contact-stopper groove is open in an outer side of the housing. With such a configuration, the contact-stopper groove and the contact-stopper protrusion can be seen from the outside. Therefore, it is possible to easily control the amount of insertion of the terminal fitting into the housing.

Details of Embodiments of the Present Disclosure

Hereinafter, specific examples of a connector C according to the present disclosure will be described with reference to the drawings. Note that the present disclosure is not limited to these examples, but is shown by the scope of claims and is intended to include all modifications within the meaning and scope equivalent to the scope of claims.

The connector C is to be mounted on an automobile (not shown) and is to be used for high-speed communication between on-board electrical components. The connector C is to be connected to a mating connector (not shown) that is provided at an end of a coaxial cable.

Hereinafter, in each constituent member, the positive side in the X axis direction in FIG. 1 (the side on which the mating connector is to be connected) is denoted as a front side, the negative side in the X axis direction in FIG. 1 is denoted as a rear side, the positive side in the Y axis direction in FIG. 1 is denoted as an upper side, the negative side in the Y axis direction in FIG. 1 (the side on which a circuit board 10 is to be provided) is denoted as a lower side, the positive side in the Z axis direction in FIG. 1 is denoted as a right side, and the negative side in the Z axis direction in FIG. 1 is denoted as a left side.

As shown in FIG. 1, the connector C includes terminal fittings T and a housing 60. The connector C is to be fixed to a circuit board 10 of an electrical device or the like. Each terminal fitting T is a shield terminal.

Figure 2:
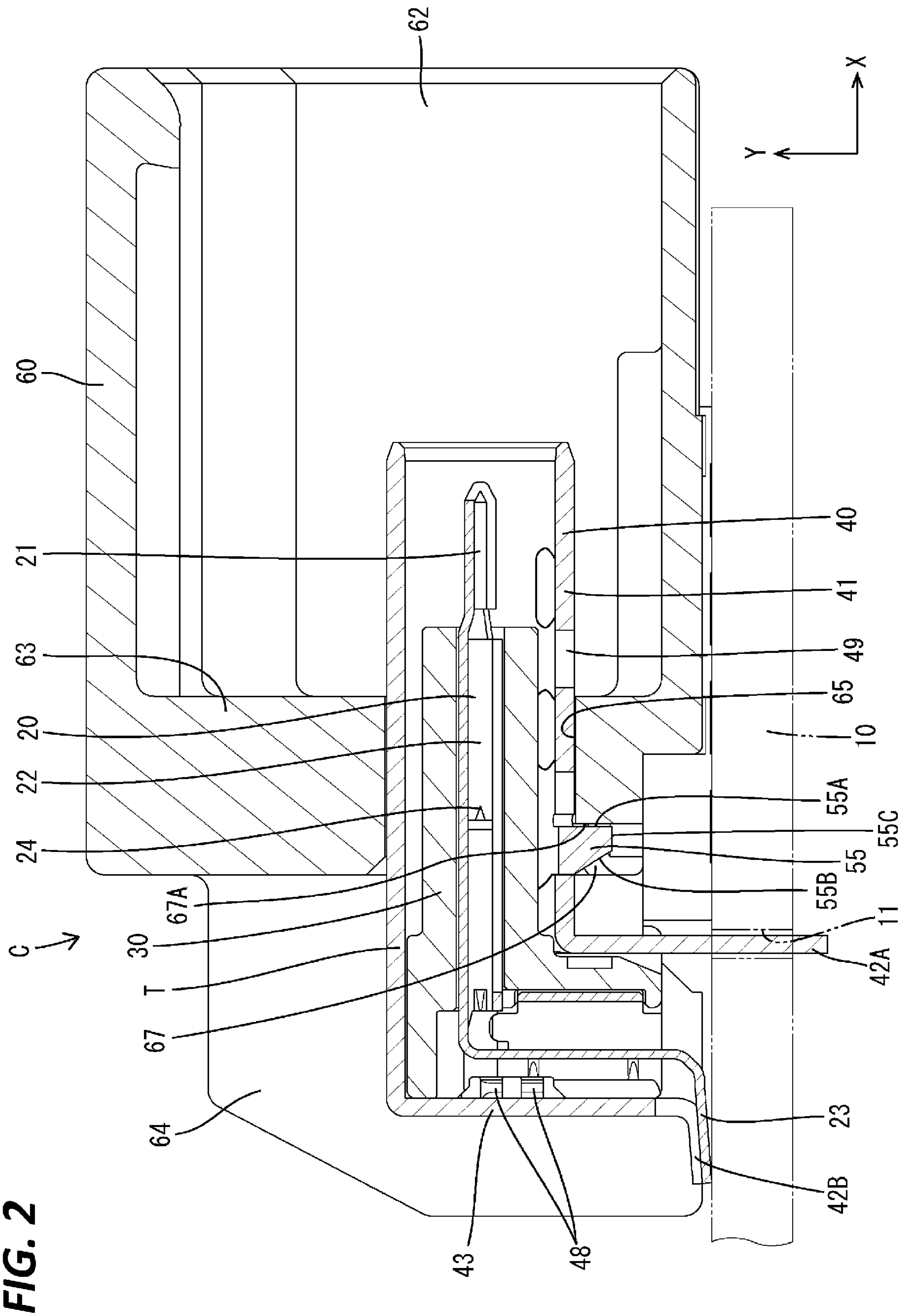
FIG. 2 is a cross-sectional view showing the connector.

As shown in FIG. 2, each terminal fitting T includes an inner conductor 20, an outer conductor 40, and a dielectric 30. The inner conductor 20 is formed by stamping a metal sheet that has excellent electrical conductivity. The inner conductor 20 includes an inner conductor connection portion 21, an inner conductor press-fitting portion 22, and an inner conductor lead portion 23. The inner conductor connection portion 21 is to be connected to an inner conductor terminal of the mating connector. The inner conductor connection portion 21 protrudes forward from the front surface of the dielectric 30.

Figure 3:
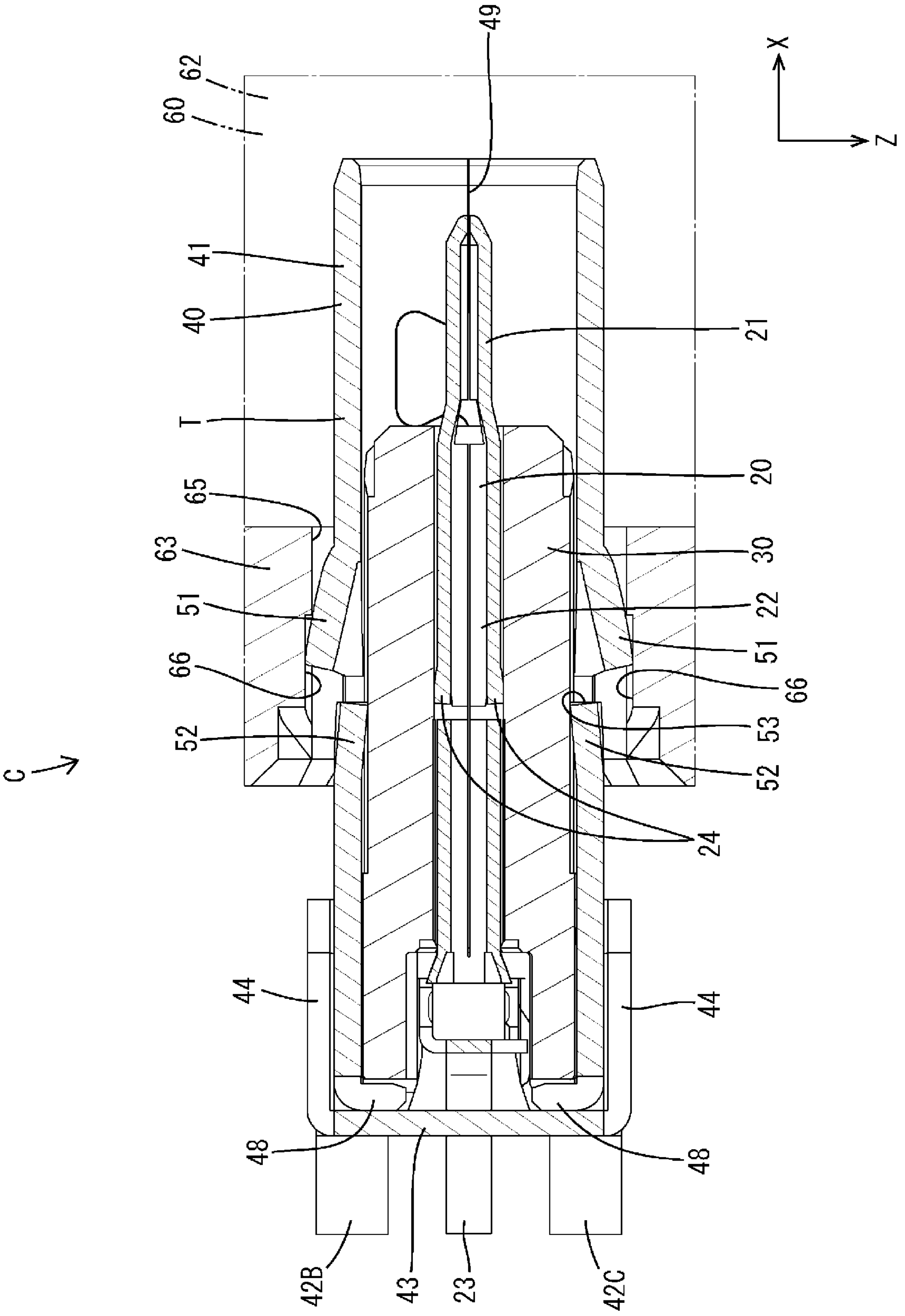
FIG. 3 is a partially-enlarged cross-sectional view of the connector, showing a state where a terminal fitting is held by a housing.

As shown in FIG. 3, the inner conductor press-fitting portion 22 includes inner conductor holding protrusions 24 that protrude outward from the outer surface thereof. As a result of the inner conductor holding protrusions 24 biting into the dielectric 30, the inner conductor 20 is fixed to the dielectric 30.

As shown in FIG. 2, the inner conductor lead portion 23 extends downward on the rear side of the inner conductor press-fitting portion 22, and a lower end portion thereof is bent rearward. The leading end of the inner conductor lead portion 23 is to be connected to a signal pattern of the circuit board 10. The inner conductor lead portion 23 is positioned between left and right outer conductor lead portions 42B and 42C (see FIG. 3).

The dielectric 30 is made of an insulating synthetic resin material that has a predetermined relative permittivity. The dielectric 30 has a cylindrical shape. The inner conductor 20 is housed in the dielectric 30. The dielectric 30 is housed in a tubular connection portion 41. The dielectric 30 keeps the inner conductor 20 and outer conductor 40 insulated.

The outer conductor 40 is formed by stamping a metal sheet that has excellent electrical conductivity. The outer conductor 40 includes the tubular connection portion 41 and an outer conductor lead portion 42.

Figure 4:
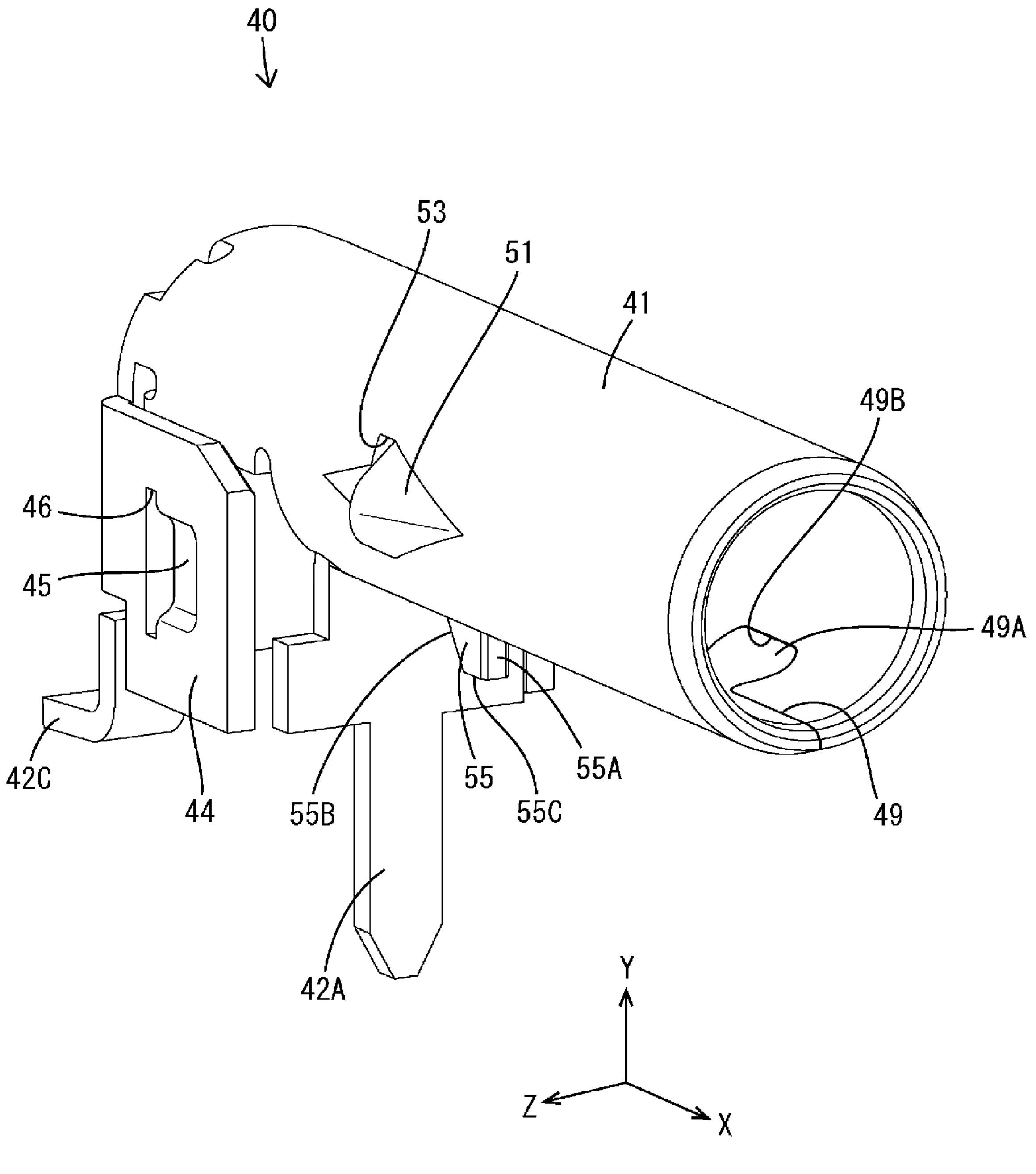
FIG. 4 is a perspective view showing the terminal fitting.

As shown in FIG. 4, the tubular connection portion 41 has a cylindrical shape. The front surface of the tubular connection portion 41 is open.

Figure 5:
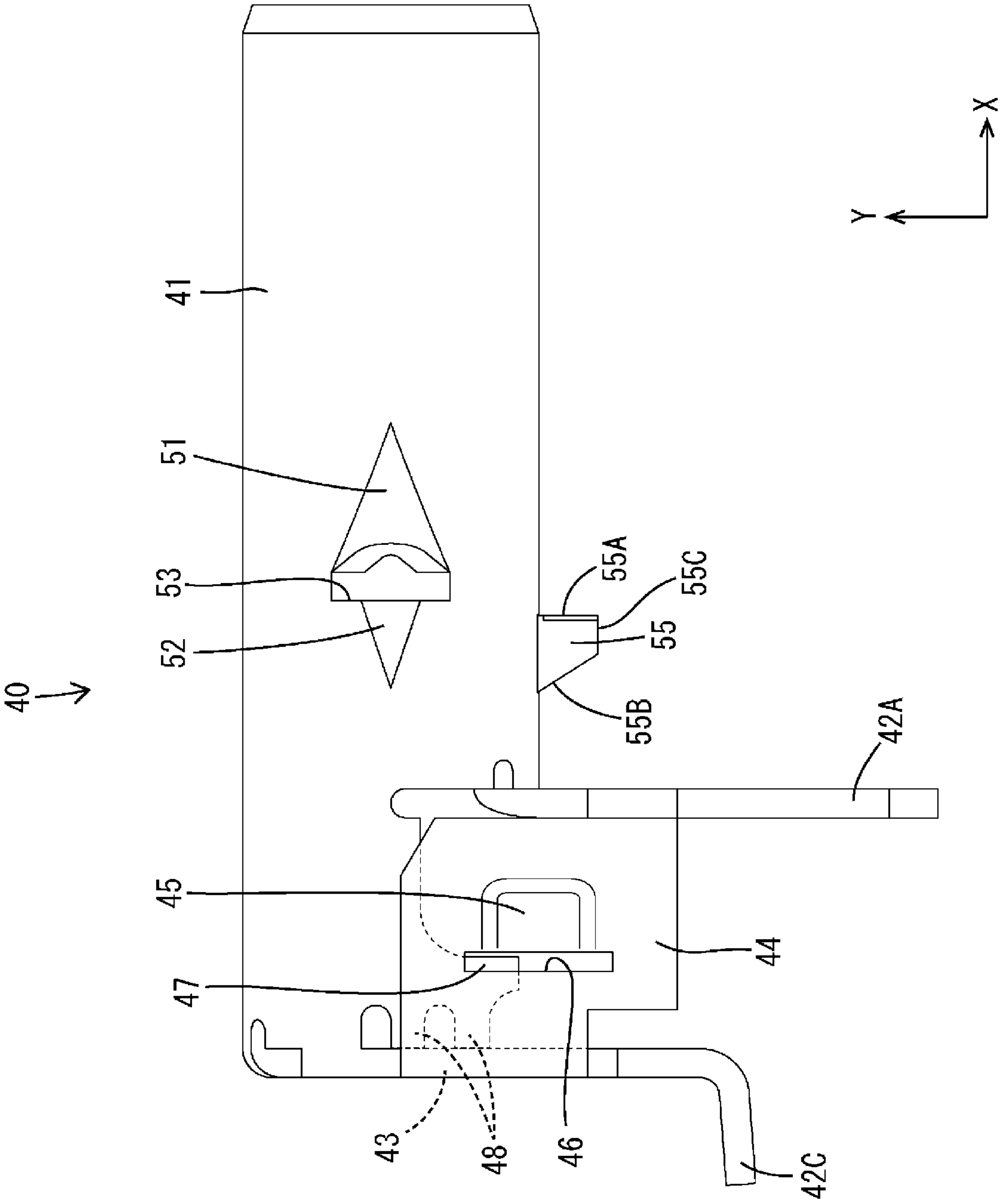
FIG. 5 is a perspective view showing the terminal fitting.

As shown in FIG. 5, the tubular connection portion 41 has a rear surface portion 43. The rear surface portion 43 closes the rear surface of the tubular connection portion 41. The rear surface portion 43 is bent downward from the upper end of the tubular connection portion 41. The lower end of the rear surface portion 43 is located downward of the lower end of the tubular connection portion 41 (see FIG. 6).

Figure 6:
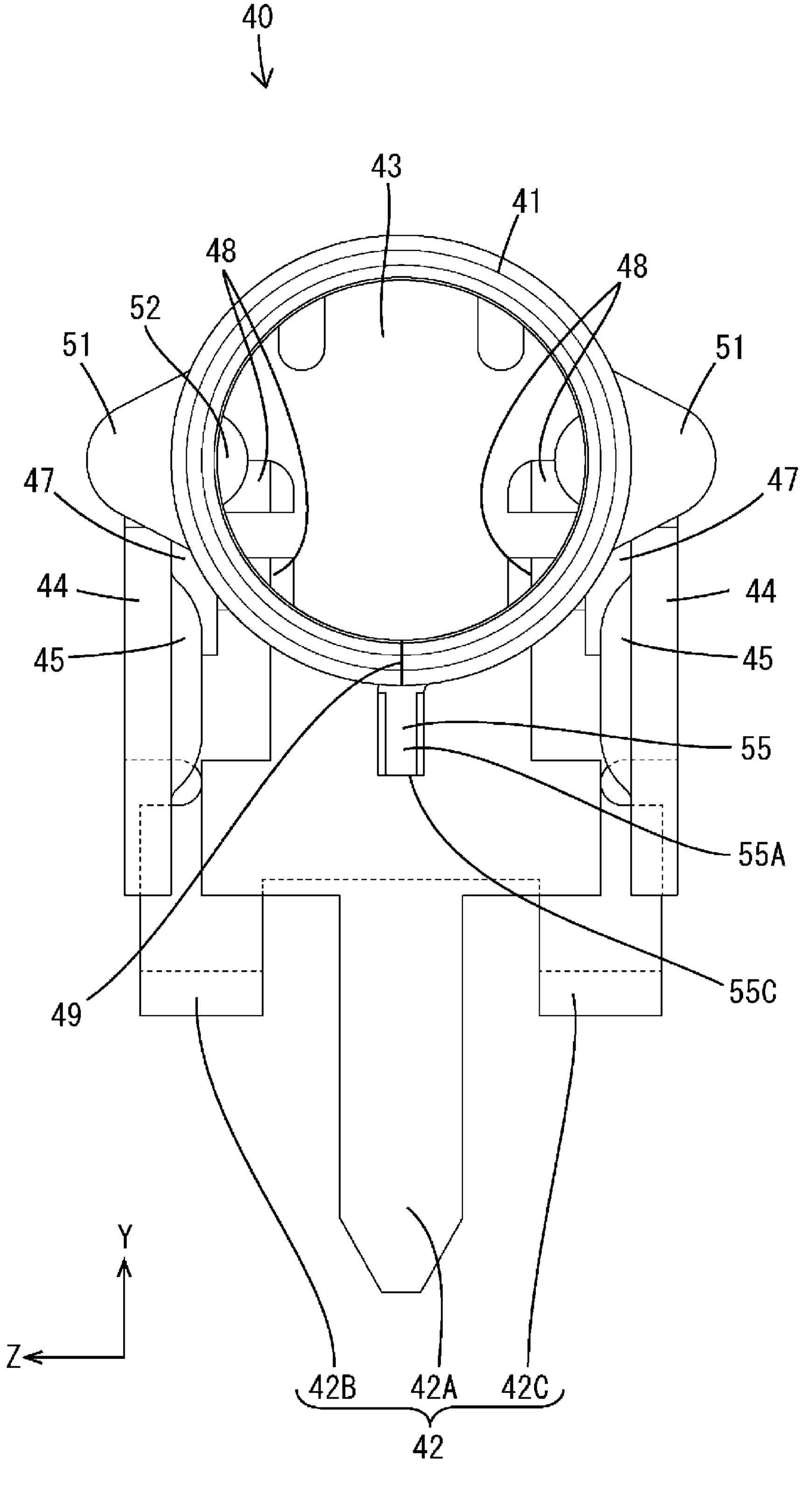
FIG. 6 is a front view showing the terminal fitting.

The rear end portion of the tubular connection portion 41 has a pair of left and right side surface portions 44. The rear edges of the pair of side surface portions 44 are respectively continuous with the left and right edges of the rear surface portion 43. The side surface portions 44 are formed by being bent from the left and right edges of the rear surface portion 43. The side surface portions 44 respectively have lock portions 45. As shown in FIG. 6, the lock portions 45 protrude inward of the left and right side surface portions 44 (toward a central position in the left-right direction). The lock portions 45 are bent inward from first slits 46 (see FIG. 5). The lock portions 45 respectively lock to lock receiver portions 47 that are provided on the tubular connection portion 41.

As shown in FIGS. 5 and 6, the tubular connection portion 41 has a pair of left and right lock receiver portions 47. The lock receiver portions 47 are provided on a rear end portion of the tubular connection portion 41. The lock receiver portions 47 respectively hang down from the upper surface side to the left and right sides of the tubular connection portion 41. The lock portions 45 respectively abut against the front surfaces of the lock receiver portions 47.

As shown in FIGS. 5 and 6, the lock receiver portions 47 respectively have abutting portions 48. The abutting portions 48 are respectively bent inward (toward a central position in the left-right direction) from the rear ends of the left and right lock receiver portions 47. The front surface of the rear surface portion 43 abuts against the abutting portions 48. As a result of the lock portions 45 being locked to the lock receiver portions 47 and the rear surface portion 43 abutting against the abutting portions 48, the rear surface portion 43 is held in a state of closing the rear surface of the tubular connection portion 41.

Figure 7:
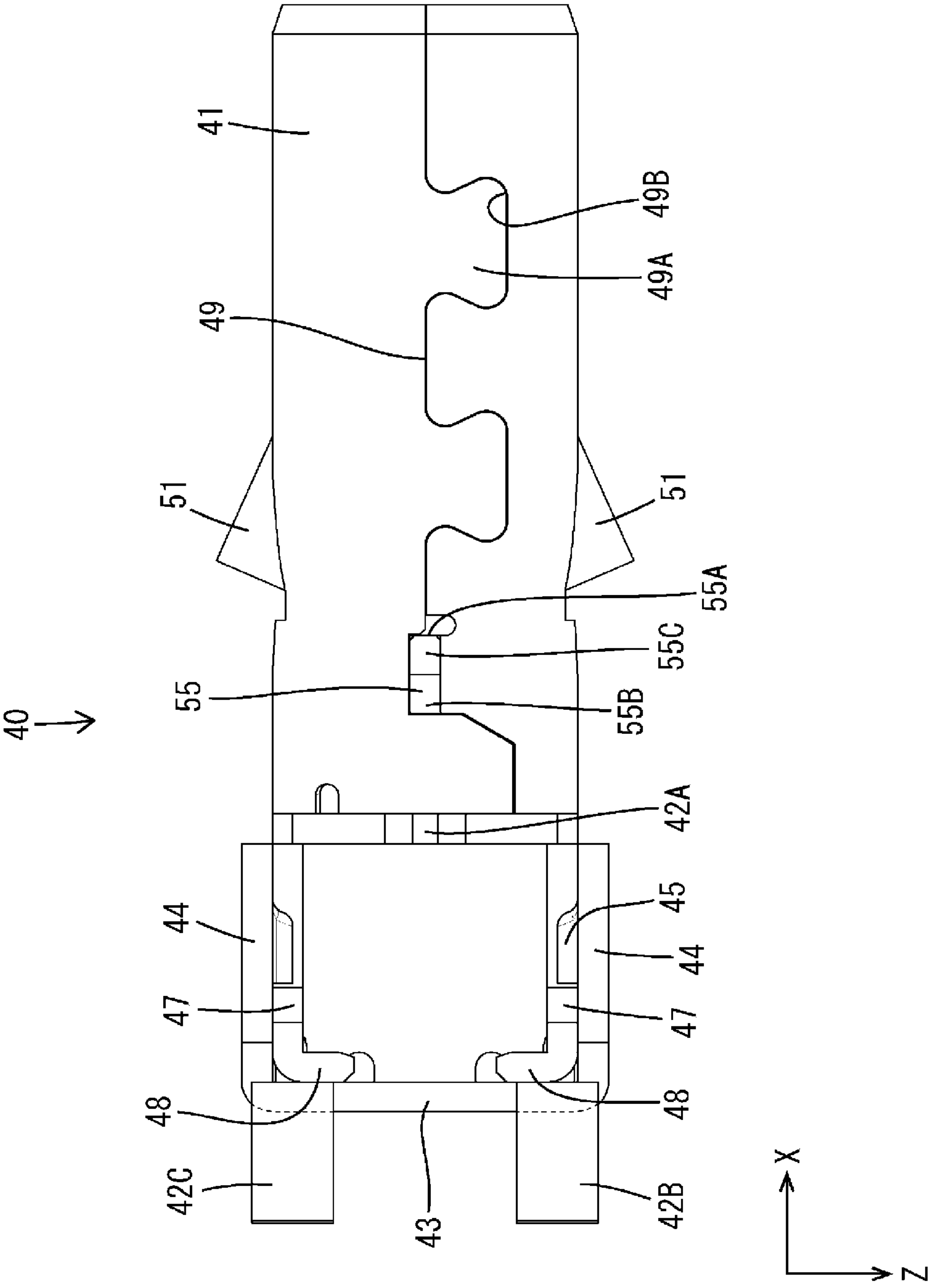
FIG. 7 is a bottom view showing the terminal fitting.

As shown in FIG. 7, the tubular connection portion 41 has mating edges 49 that abut against each other in the circumferential direction thereof. The mating edges 49 are formed on the lower surface of the tubular connection portion 41. The mating edges 49 of the tubular connection portion 41 each have protruding portions 49A and recessed portions 49B that are alternatingly arranged in the front-rear direction. The left and right mating edges 49 are closed with the protruding portions 49A and the recessed portions 49B engaging with each other. The mating edges 49 are provided with a contact-stopper protrusion 55. The contact-stopper protrusion 55 will be described later in detail.

As shown in FIG. 3, the tubular connection portion 41 has locking protrusions 51 that are locked to the locking grooves 66 formed in the housing 60. The locking protrusions 51 are press-fitted into the locking grooves 66. The locking protrusions 51 are provided so as to protrude from the outer circumferential surface side of the tubular connection portion 41. The locking protrusions 51 are formed by bending portions of the tubular connection portion 41 to the outer circumferential surface side. The locking protrusions 51 are respectively provided at two end portions of the tubular connection portion 41 in the left-right direction. As shown in FIG. 6, the locking protrusions 51 each have a substantially triangular shape in a side view. Each locking protrusion 51 is provided on a central portion of the tubular connection portion 41 in the front-rear direction.

As shown in FIG. 3, the tubular connection portion 41 has dielectric holding protrusions 52 that hold the dielectric 30. The dielectric holding protrusions 52 protrude on the inner circumferential surface side of the tubular connection portion 41. The dielectric holding protrusions 52 are formed by bending portions of the tubular connection portion 41 to the inner circumferential surface side. The dielectric holding protrusions 52 are provided rearward of the locking protrusions 51. Second slits 53 are formed between the locking protrusions 51 and the dielectric holding protrusions 52, respectively. The second slits 53 each extend through the tubular connection portion 41 in a direction from the inside to the outside.

As shown in FIG. 2, the outer conductor lead portion 42 is to be connected to the circuit board 10. The outer conductor lead portion 42 extends downward from the lower surface of the tubular connection portion 41. The outer conductor lead portion 42 includes a first lead portion 42A, a second lead portion 42B, and a third lead portion 42C. The first lead portion 42A is located forward of the second lead portion 42B and the third lead portion 42C. As shown in FIG. 3, the second lead portion 42B and the third lead portion 42C are aligned in the front-rear direction.

As shown in FIG. 2, the first lead portion 42A is formed by being bent downward from the lower surface of the tubular connection portion 41. The first lead portion 42A is inserted into a connection hole 11 formed in the circuit board 10. The first lead portion 42A is electrically connected to a first ground portion formed in the circuit board 10.

As shown in FIG. 3, the second lead portion 42B and the third lead portion 42C are provided at a rear end portion of the tubular connection portion 41. The second lead portion 42B and the third lead portion 42C are provided on the left and right sides of the tubular connection portion 41. The second lead portion 42B and the third lead portion 42C have the same shape. As shown in FIG. 1, the second lead portion 42B and the third lead portion 42C extend from the lower end of the rear surface portion 43, and lower end portions thereof are bent rearward. The leading end portions of the second lead portion 42B and the third lead portion 42C are electrically connected to the first ground portion and a second ground portion formed on the surface of the circuit board 10, respectively.

As shown in FIG. 6, the contact-stopper protrusion 55 is provided on the lower surface of the tubular connection portion 41. The contact-stopper protrusion 55 is provided on a central portion of the tubular connection portion 41 in the front-rear direction. The contact-stopper protrusion 55 is bent from the right mating edge 49 to the outer circumferential surface side. As shown in FIG. 7, the contact-stopper protrusion 55 is continuous with the leading end of the protruding portion 49A provided on the right mating edge 49. The left and right plate surfaces of the contact-stopper protrusion 55 are parallel to the front-rear direction.

As shown in FIG. 2, the contact-stopper protrusion 55 enters a contact-stopper groove 67 that is formed in the housing 60. A front surface SSA of the contact-stopper protrusion 55 abuts against a front surface 67A of the contact-stopper groove 67 when the tubular connection portion 41 is inserted into the housing 60 to a regular position.

As shown in FIG. 5, the front surface SSA of the contact-stopper protrusion 55 is orthogonal to the outer surface of the tubular connection portion 41. A rear surface 55B of the contact-stopper protrusion 55 is inclined rearward so that the amount of protrusion from the tubular connection portion 41 is reduced. A lower surface 55C of the contact-stopper protrusion 55 is parallel to the direction in which the tubular connection portion 41 is inserted into a cavity 65.

Figure 8:
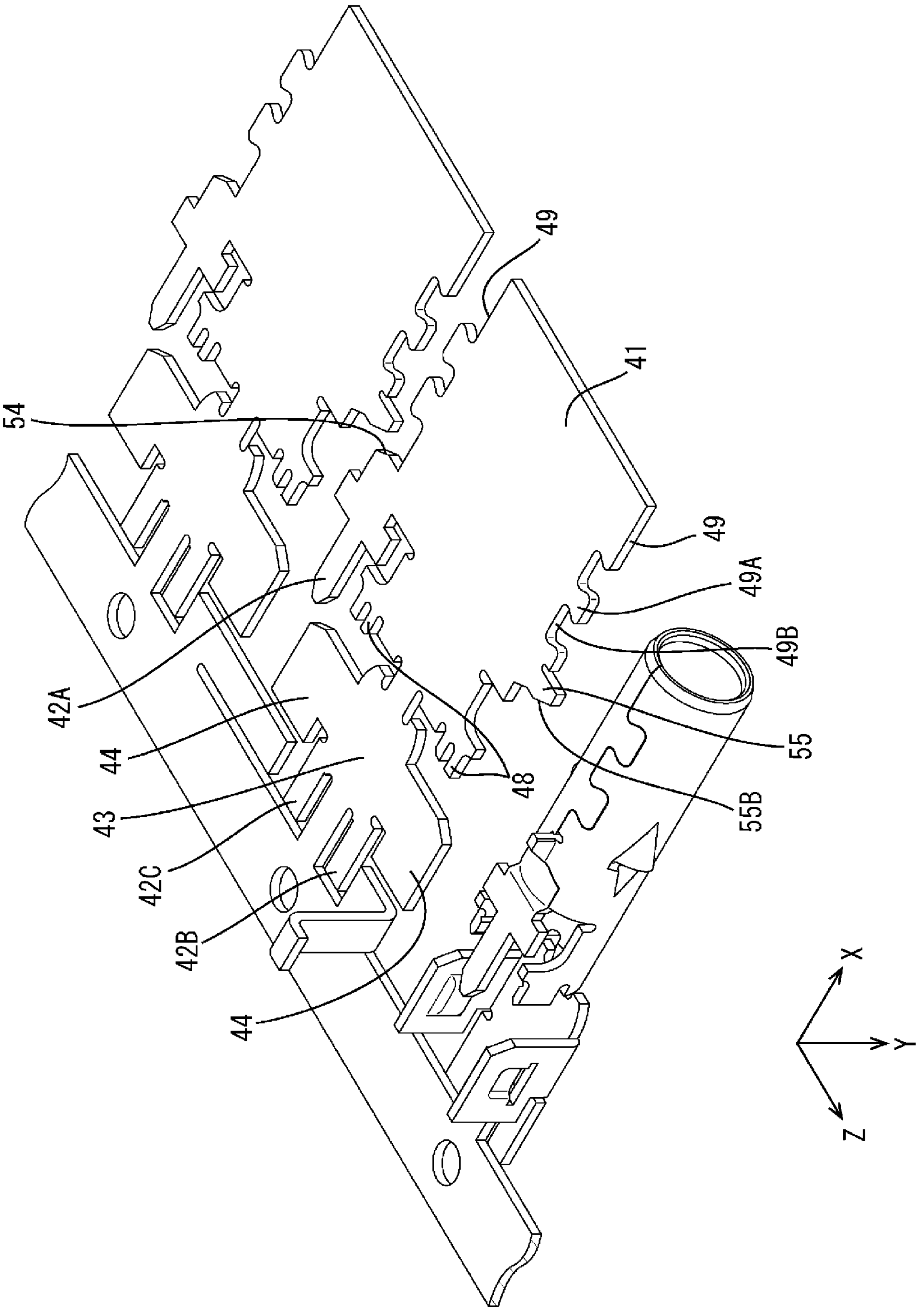
FIG. 8 is a developed view of an outer conductor.

As shown in FIG. 8, in a developed state where the outer conductor 40 is unfolded so as to extend in one plane, the second lead portion 42B, the third lead portion 42C, the rear surface portion 43, and the tubular connection portion 41 are continuous in this order from the rear side. The contact-stopper protrusion 55 is provided on the right mating edge 49 of the tubular connection portion 41 in a developed state. The left mating edge 49 of the tubular connection portion 41 in a developed state is provided with the first lead portion 42A. The first lead portion 42A is continuous with the left mating edge 49 and extends rearward. The rear surface 55B of the contact-stopper protrusion 55 in a developed state is located opposite an inclined surface 54 of the first lead portion 42A so as to be parallel thereto. As a result, the distance between adjacent outer conductors 40 in a developed state can be short.

The tubular connection portion 41 is bent downward from the developed state (upward in FIG. 8), and the mating edges 49 are mated with each other. The contact-stopper protrusion 55 is bent downward from the right mating edge 49. The mating edges 49 are closed along the entire length thereof.

As shown in FIG. 2, the first lead portion 42A is bent downward from the state of extending rearward from the rear end of the lower surface of the tubular connection portion 41 (see FIG. 8).

The left and right side surface portions 44 are bent downward (see FIG. 8) from the left and right edges of the rear surface portion 43 that is in the state of extending rearward from the rear end of the tubular connection portion 41. The abutting portions 48 and the rear surface portion 43 are bent after the dielectric 30 and the inner conductor 20 are housed in the outer conductor 40.

The housing 60 is made of a synthetic resin. As shown in FIG. 1, the housing 60 includes board fixing portions 61, a connector fitting portion 62, a terminal holding portion 63, and protection portions 64.

The board fixing portions 61 are respectively provided in the left and right surfaces of the housing 60. The board fixing portions 61 are fixed to the circuit board 10.

As shown in FIG. 2, the connector fitting portion 62 is provided in a front portion of the housing 60. The mating connector is to be fitted into the connector fitting portion 62 from the front side. The connector fitting portion 62 has a square tube shape elongated in the left-right direction.

As shown in FIG. 2, the terminal holding portion 63 is provided in a rear portion of the housing 60. The terminal holding portion 63 holds the terminal fittings T. Cavities 65 are formed in the terminal holding portion 63. Four cavities 65 are arranged in the left-right direction (see FIG. 9). Each cavity 65 extends through the terminal holding portion 63 in the front-rear direction. The terminal fittings T are respectively inserted into the cavities 65 from the rear side. The respective front end portions of the terminal fittings T held by the terminal holding portion 63 protrude forward from the front surface of the terminal holding portion 63. The respective rear end portions of the terminal fittings T held by the terminal holding portion 63 protrude rearward from the rear surface of the terminal holding portion 63.

As shown in FIG. 3, the terminal holding portion 63 is provided with locking grooves 66 to which the locking protrusions 51 of the terminal fittings T can be locked. The locking grooves 66 are provided on the left and right sides of each cavity 65. The locking grooves 66 extend through the terminal holding portion 63 in the front-rear direction. The locking grooves 66 extend straight. The size of each locking groove 66 in the left-right direction gradually decreases in a direction from the rearward to the forward. The locking protrusions 51 are press-fitted into the locking grooves 66.

As shown in FIG. 2, the terminal holding portion 63 is provided with contact-stopper grooves 67 into which the contact-stopper protrusions 55 are respectively inserted. Each contact-stopper groove 67 is provided in the lower surface of the cavity 65 corresponding thereto. Each contact-stopper groove 67 extends from the rear surface of the terminal holding portion 63 to an intermediate position of the terminal holding portion 63 in the front-rear direction thereof. The front surface 67A of each contact-stopper groove 67 is located rearward of a central position of the terminal holding portion 63 in the front-rear direction thereof. The front surface 67A of each contact-stopper groove 67 is orthogonal to the front-rear direction.

Figure 9:
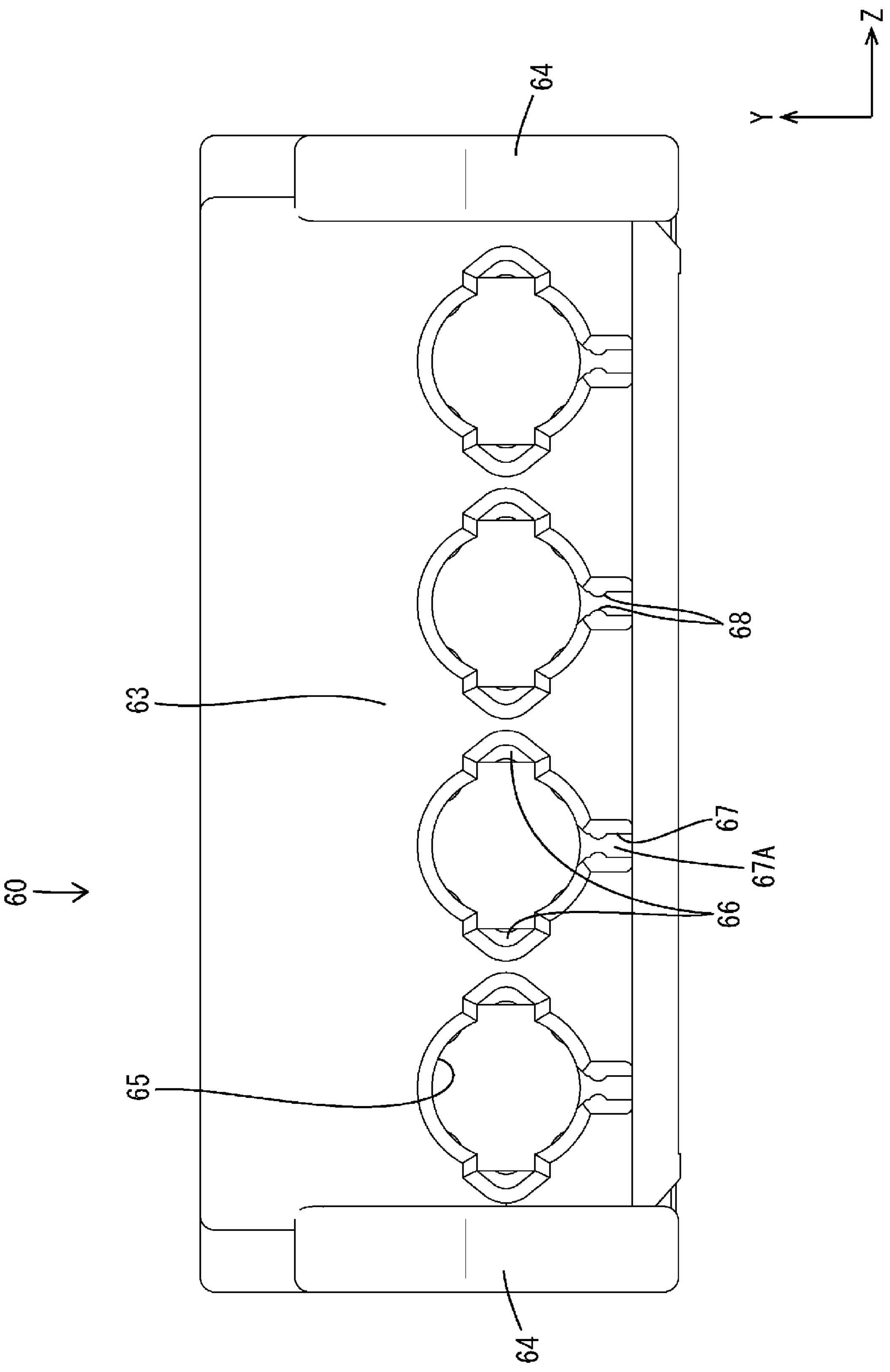
FIG. 9 is a rear view showing the housing.

As shown in FIG. 9, each contact-stopper groove 67 is located at a central position in the left-right direction of the cavity 65 corresponding thereto. The contact-stopper grooves 67 are open in the rear surface and the lower surface of the terminal holding portion 63. Ribs 68 are respectively provided on the left and right surfaces of each contact-stopper groove 67. The protruding surface of each rib 68 is an arc surface. The left and right ribs 68 come into contact with the left and right surfaces of the contact-stopper protrusion 55 corresponding thereto. Each rib 68 extends from the rear end to the front end of the contact-stopper groove 67 corresponding thereto.

As shown in FIG. 1, the protection portions 64 are provided on the rear side of the terminal holding portion 63. The protection portions 64 are respectively provided on the left and right sides of the housing 60.

Next, an example of the assembly procedure for the connector C will be described.

First, each outer conductor 40 is inserted into the housing 60. At this time, the rear surface portion 43 of each outer conductor 40 extends rearward from the upper surface of the tubular connection portion 41 corresponding thereto. The abutting portions 48 extend rearward from the rear ends of the lock receiver portions 47. In other words, the rear surface of each tubular connection portion 41 is open.

To insert each outer conductor 40 into the housing 60, the locking protrusions 51 of the outer conductor 40 are positioned with respect to the locking grooves 66 of the housing 60, the contact-stopper protrusion 55 is positioned with respect to the contact-stopper groove 67, and the tubular connection portion 41 is inserted into one of the cavities 65 of the terminal holding portion 63. First, the locking protrusions 51 are inserted into the locking grooves 66, and thereafter the contact-stopper protrusion 55 is inserted into the contact-stopper groove 67. The ribs 68 of the contact-stopper groove 67 come into contact with the left and right surfaces of the contact-stopper protrusion 55. As a result, the contact-stopper protrusion 55 is prevented from rattling in the left-right direction. Thereafter, the front surface SSA of the contact-stopper protrusion 55 abuts against the front surface 67A of the contact-stopper groove 67. As a result, the outer conductor 40 is stopped from moving forward. Thus, the outer conductor 40 is fixed to a regular position in the cavity 65. The locking protrusions 51 are prevented from being excessively press-fitted into the locking grooves 66.

As shown in FIG. 2, in a state where the contact-stopper protrusion 55 is inserted into the contact-stopper groove 67, the entire contact-stopper protrusion 55 is housed in the contact-stopper groove 67. The front surface 55A of the contact-stopper protrusion 55 abuts against the front surface 67A of the contact-stopper groove 67. The rear end surface of the contact-stopper protrusion 55 is aligned with the rear end of the contact-stopper groove 67. The lower surface (the protruding end surface) 55C of the contact-stopper protrusion 55 is located upward of the lower surface of the terminal holding portion 63 (the lower end of the contact-stopper groove 67). As a result of the contact-stopper protrusion 55 being inserted into the contact-stopper groove 67, the outer conductor 40 is prevented from being rotated.

Next, the dielectric 30 is housed in the outer conductor 40. Specifically, the dielectric 30 is inserted into the outer conductor 40 from the rear side.

Next, the inner conductor 20 is housed in the dielectric 30. Specifically, the inner conductor 20 is inserted into the dielectric 30 from the rear side.

Next, the rear surface of the tubular connection portion 41 is closed. Specifically, the abutting portions 48 and the rear surface portion 43 of the outer conductor 40 are bent. The abutting portions 48 are bent inward (toward a central position in the left-right direction) from the rear ends of the lock receiver portions 47 (see FIG. 7). The rear surface portion 43 is bent downward from the rear end of the upper surface of the tubular connection portion 41. As a result, the left and right side surface portions 44 covers the outer surfaces of the lock receiver portions 47. The lock portion 45 of each side surface portion 44 is locked to the front surface of the lock receiver portion 47 corresponding thereto. The front surface of the rear surface portion 43 abuts against the abutting portions 48. The rear surface portion 43 closes the rear surface of the tubular connection portion 41.

Thereafter, the connector C is installed on the surface of the circuit board 10. The board fixing portions 61 are fixed to the circuit board 10. The inner conductor lead portion 23 is electrically connected to a conductive portion for signal transmission. The first lead portion 42A, the second lead portion 42B, and the third lead portion 42C are respectively connected to the first ground portion, the second ground portion, and a third ground portion.

The electric signal flowing through the inner conductor 20 flows to the conductive portion of the circuit board 10 via the inner conductor lead portion 23. A return current is generated in the outer conductor 40 in response to an electric signal. The return current flows through the outer conductor 40, and is conducted from the first lead portion 42A, the second lead portion 42B, and the third lead portion 42C to the first ground portion, the second ground portion, and the third ground portion of the circuit board 10.

Next, the operation and effects of the embodiment with the above-described configuration will be described.

Each terminal fitting T includes a tubular connection portion 41, locking protrusions 51, and a contact-stopper protrusion 55. The locking protrusions 51 are provided so as to protrude from the outer circumferential surface side of the tubular connection portion 41. The locking protrusions 51 are locked to grooves provided in the housing 60. The contact-stopper protrusion 55 is provided on the outer circumferential surface side of the tubular connection portion 41 so as to protrude from the mating edges 49 of the tubular connection portion 41 abutting against each other in the circumferential direction thereof. The contact-stopper protrusion 55 comes into contact with the housing 60 and stops in place. With this configuration, as a result of the contact-stopper protrusion 55 coming into contact with the housing 60 and stopping in place, the insertion of the terminal fitting T is stopped. Therefore, it is possible to easily control the amount of insertion of the terminal fitting T into the housing 60. In addition, the contact-stopper protrusion 55 is provided on one of the mating edges 49 of the tubular connection portion 41. Therefore, it is possible to provide the contact-stopper protrusion 55 without forming an opening in the tubular connection portion 41.

Each terminal fitting T has an outer conductor lead portion 42 that is to be connected to the circuit board 10. The outer conductor lead portion 42 extends downward on the outer circumferential surface side of the tubular connection portion 41. The contact-stopper protrusion 55 is provided on the lower side of the tubular connection portion 41. With this configuration, the side on which the mating edges 49 of the tubular connection portion 41 abut against each other and the side from which the outer conductor lead portion 42 extends can be the same side. Therefore, it is easier to manufacture the terminal fitting T.

The connector C includes a terminal fitting T and a housing 60. The terminal fitting T is inserted into the housing 60. The housing 60 has a contact-stopper groove 67 into which the contact-stopper protrusion 55 is to be inserted. The contact-stopper groove 67 is open in the lower side of the housing 60. With this configuration, the contact-stopper groove 67 and the contact-stopper protrusion 55 can be seen from the outside. Therefore, it is possible to easily control the amount of insertion of the terminal fitting T into the housing 60.

Other Embodiments of Present Disclosure

The embodiments disclosed herein should be considered exemplary and not restrictive in all respects.

(1) In the above-described embodiment, the contact-stopper protrusion 55 is provided on the lower surface of the tubular connection portion 41. However, in other embodiments, the contact-stopper protrusion may be provided on the upper surface, the left surface, or the right surface of the tubular connection portion.

(2) In the above-described embodiment, the contact-stopper groove 67 is provided in the lower surface of the housing 60. However, in other embodiments, the contact-stopper groove does not have to be open in the lower surface of the housing.

(3) In the above-described embodiment, the connector C is to be connected to the circuit board 10. However, in other embodiments, the connector does not have to be connected to a circuit board. That is to say, the connector may be for a wire harness.

LIST OF REFERENCE NUMERALS

C Connector
T Terminal Fitting
10 Circuit Board
11 Connection Hole
20 Inner Conductor
21 Inner Conductor Connection Portion
22 Inner Conductor Press-Fitting Portion
23 Inner Conductor Lead Portion
24 Inner Conductor Holding Protrusion
30 Dielectric
40 Outer Conductor
41 Tubular Connection Portion
42 Outer Conductor Lead Portion
42A First Lead Portion
42B Second Lead Portion
42C Third Lead Portion
43 Rear Surface Portion
44 Side Surface Portion
45 Lock Portion
46 First Slit
47 Lock Receiver Portion
48 Abutting Portion
49 Mating Edge
49A Protruding Portion
49B Recessed Portion
51 Locking Protrusion
52 Dielectric Holding Protrusion
53 Second Slit
54 Inclined Surface
55 Contact-stopper Protrusion
55A Front Surface
55B Rear Surface
55C Lower Surface
60 Housing
61 Board Fixing Portion
62 Connector Fitting Portion
63 Terminal Holding Portion
64 Protection Portion
65 Cavity
66 Locking Groove
67 Contact-stopper Groove
67A Front Surface
68 Rib

What is claimed is:

1. A terminal fitting comprising:
a tubular connection portion;
a locking protrusion that is provided so as to protrude from an outer circumferential surface side of the tubular connection portion, and is configured to be locked to a groove provided in a housing; and
a contact-stopper protrusion that is provided on the outer circumferential surface side of the tubular connection portion so as to protrude from mating edges that abut against each other in a circumferential direction thereof in the tubular connection portion, and is configured to come into contact with the housing and stop in place,
wherein, in a state where the tubular connection portion is inserted to a regular position in the housing, a surface of the contact-stopper protrusion opposite to a surface thereof that comes into contact with the housing and stops in place is not locked to the housing,
the mating edges each having at least one of a protruding portion and a recessed portion are closed with the protruding portion and the recessed portion engaging with each other, and
the contact-stopper protrusion protrudes from the protruding portion.

2. The terminal fitting according to claim 1, further comprising
a lead portion configured to be connected to a circuit board,
wherein the lead portion extends to one side on the outer circumferential surface side of the tubular connection portion, and
the contact-stopper protrusion is provided on the one side of the tubular connection portion.

3. A connector comprising:
the terminal fitting according to claim 1; and
the housing into which the terminal fitting is to be inserted, wherein the housing has a contact-stopper groove into which the contact-stopper protrusion is to be inserted, and the contact-stopper groove is open in an outer side of the housing.

4. The connector according to claim 3, wherein the contact-stopper groove includes a hole which is open in a direction perpendicular to an axis of the tubular connection portion to expose the contact-stopper protrusion through the hole.

* * * * *